United States Patent
van der Made

(10) Patent No.: US 7,370,360 B2
(45) Date of Patent: *May 6, 2008

(54) COMPUTER IMMUNE SYSTEM AND METHOD FOR DETECTING UNWANTED CODE IN A P-CODE OR PARTIALLY COMPILED NATIVE-CODE PROGRAM EXECUTING WITHIN A VIRTUAL MACHINE

(75) Inventor: Peter A. J. van der Made, Newport Beach (AU)

(73) Assignee: International Business Machines Corporation, Armonk, NY (US)

( * ) Notice: Subject to any disclaimer, the term of this patent is extended or adjusted under 35 U.S.C. 154(b) by 1028 days.

This patent is subject to a terminal disclaimer.

(21) Appl. No.: 10/145,592

(22) Filed: May 13, 2002

(65) Prior Publication Data

US 2003/0212902 A1  Nov. 13, 2003

(51) Int. Cl.
*G06F 11/00* (2006.01)
(52) U.S. Cl. .................. 726/24; 717/134; 717/135; 714/37; 714/38; 726/26; 713/187; 713/188
(58) Field of Classification Search ............... 726/3–4, 726/13–15, 22–27, 30, 18, 34; 711/6, 100; 709/1, 100, 223–225, 16, 18; 713/1–3, 187, 713/188; 382/181, 197; 717/135, 134; 710/16, 710/18; 714/37, 38
See application file for complete search history.

(56) References Cited

U.S. PATENT DOCUMENTS 4,223,380 A  9/1980  Antonaccio et al.

(Continued)

FOREIGN PATENT DOCUMENTS

EP  0 636 977 A2  2/1995

(Continued)

OTHER PUBLICATIONS

"Info: Visual Basic Supports P-Code and Native Code Compilation (Q229415)," http://support.microsoft.com/support/kb/articles/Q229/4/15.ASP, pp. 1-2, Apr. 28, 1999.

(Continued)

*Primary Examiner*—Kim Vu
*Assistant Examiner*—April Y. Shan
(74) *Attorney, Agent, or Firm*—King & Spalding LLP

(57) ABSTRACT

An automated analysis system identifies the presence of malicious P-code or N-code programs in a manner that limits the possibility of the malicious code infecting a target computer. The target computer system initializes an analytical virtual P-code engine (AVPE). As initialized, the AVPE comprises software simulating the functionality of a P-code or intermediate language engine as well as machine language facilities simulating the P-code library routines that allow the execution of N-code programs. The AVPE executes a target program so that the target program does not interact with the target computer. The AVPE analyzes the behavior of the target program to identify occurrence of malicious code behavior and to indicate in a behavior pattern the occurrence of malicious code behavior. The AVPE is terminated at the end of the analysis process, thereby removing from the computer system the copy of the target program that was contained within the AVPE.

27 Claims, 7 Drawing Sheets

U.S. PATENT DOCUMENTS

| | | | |
|---|---|---|---|
| 4,400,769 A | 8/1983 | Kaneda et al. |
| 4,672,609 A | 6/1987 | Humphrey et al. |
| 4,773,028 A | 9/1988 | Tallman |
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lews et al. |
| 5,594,903 A * | 1/1997 | Bunnell et al. ............. 717/162 |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,715,395 A | 2/1998 | Brabson et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,915 A | 2/1999 | Dykes et al. |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,905,859 A | 5/1999 | Holloway et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,014,702 A * | 1/2000 | King et al. ................. 709/227 |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,063,133 A * | 5/2000 | Li et al. ..................... 717/136 |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,073,222 A * | 6/2000 | Ohran ........................ 711/162 |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |

| | | |
|---|---|---|
| 6,199,181 B1 | 3/2001 | Rechef et al. |
| 6,205,552 B1 | 3/2001 | Fudge |
| 6,220,768 B1 | 4/2001 | Barroux |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 | 8/2001 | Gleichauf et al. |
| 6,298,445 B1 | 10/2001 | Shostack et al. |
| 6,301,668 B1 | 10/2001 | Gleichauf et al. |
| 6,314,520 B1 | 11/2001 | Schell et al. |
| 6,314,525 B1 | 11/2001 | Mahalingham et al. |
| 6,314,559 B1 * | 11/2001 | Sollich .................. 717/111 |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,338,141 B1 | 1/2002 | Wells |
| 6,347,374 B1 | 2/2002 | Drake et al. |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,467,002 B1 | 10/2002 | Yang |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,493,752 B1 | 12/2002 | Lee et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,643,657 B1 * | 11/2003 | Baird et al. ................ 707/100 |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,230 B1 * | 2/2004 | Bardon ..................... 726/27 |
| 6,691,232 B1 | 2/2004 | Wood et al. |
| 6,704,874 B1 | 3/2004 | Porras et al. |
| 6,705,850 B1 * | 3/2004 | Fofonoff ................... 425/67 |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,732,220 B2 * | 5/2004 | Babaian et al. ............. 711/6 |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,839,850 B1 | 1/2005 | Campbell et al. |
| 6,851,057 B1 | 2/2005 | Nachenberg |
| 6,871,284 B2 | 3/2005 | Cooper et al. |
| 6,886,102 B1 | 4/2005 | Lyle |
| 6,889,168 B2 | 5/2005 | Hartley et al. |
| 6,912,676 B1 | 6/2005 | Gusler et al. |
| 6,934,945 B1 * | 8/2005 | Ogilvy ..................... 718/1 |
| 6,971,019 B1 * | 11/2005 | Nachenberg ............ 713/188 |
| 7,093,239 B1 | 8/2006 | van der Made |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |

FOREIGN PATENT DOCUMENTS

| | | |
|---|---|---|
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | PCT/US01/26804 | 3/2002 |
| WO | WO 02/056152 | 7/2002 |
| WO | WO 02/101516 | 12/2002 |

OTHER PUBLICATIONS

"Microsoft P-Code Technology," http://msdn.microsoft.com/archive/default.asp?url=/archive/en-us/dnarvc/html/msdn_c7pcode2.asp, pp. 1-6, Apr. 1992.
"DJGPP COFF Spec," http://www.delorie.com/digpp/doc/coff/), pp. 1-15, Oct. 1996.
Natvig, Kurt, "Sandbox Technology Inside AV Scanners," Virus Bulletin Conference, Sep. 2001, pp. 475-488.

"Norman introduces a new technique for eliminating new computer viruses," found on Norman's website, file://C:\Documents%20and%Settings\7489\Local%20Settings\Temporary%20Internet%20Files\OLK6, pp. 1-2, published Oct. 25, 2001, printed from the website Dec. 27, 2002.

Lee et al., "A Generic Virus Detection Agent on the Internet," System Sciences, 1997, Proceedings of the Thirtieth Hawaii International Conference on Wailea, HI, Jan. 7-10, 1997, pp. 210-219, #XP010271868.

International Search Report for PCT/US01/19142, international filing date Jun. 14, 2001, mailing date Jan. 17, 2003.

Gong, Li, "Java™ Security Architecture (JDK1.2)," Oct. 2, 1998, Sun Microsystems, Inc., Version 1.0, pp. i-iv, 1-62.

"Softworks Limited VBVM Whitepaper," [online] Nov. 3, 1998 [accessed Mar. 19, 2003], Retrieved from Internet <URL: http://web.archive.org/web/19981203105455/http://softworksltd.com/vbvm.html>, pp. 1-4.

Kephart, "A Biologically Inspired Immune System for Computers," Artificial Life, IV, 1994, pp. 130-139.

"Advanced Virus Detection Technology for the Next Millennium," Aug. 1999, Network Associates, A Network Associates Executive White Paper, pp. 1-14.

"Enterprise-Grade Anti-Virus Automation in the 21st Century," Jun. 2000, Symantec, Technology Brief, pp. 1-17.

Jeffrey O. Kephart, et al., "Blueprint for a Computer Immune System," [online] 1997, Retrieved from Internet, URL: http://research.ibm.com/antivirus/SciPapers/Kephart/VB97/., pp. 1-15.

Baudouin Le Charlier, et al., "Dynamic Detection and Classification of Computer Viruses Using General Behavior Patters," 1995, Proceedings of the Fifth International Virus Bulletin Conference, Boston, pp. 1-22.

Robert Richardson, "Enterprise Antivirus Software," [online] Feb. 2000, Retrieved from Internet, URL: http://www.networkmagazine.com/article/NMG20000426S0006., pp. 1-6.

"Understanding and Managing Polymorphic Viruses," 1996, Symantec, The Symantec Enterprise Papers, vol. XXX, pp. 1-13.

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.

International Search Report for PCT/US02/02917 of Aug. 8, 2002.

International Search Report for PCT/US03/00155 of May 15, 2003.

NXI Communications, Inc., White Paper, NTS Security Issues, Oct. 15, 2001, pp. 1-12.

Mounji et al., Distributed Audit Trail Analysis, Proceedings of the Symposium of Network and Distributed System Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.

Mayer et al., The Design of the Trusted Workstation: A True Infosec Product, 13th National Computer Security Conference, Washington, Internet%20Files%20Ipp, 827-839.

Dawson, Intrusion Protection for Networks, Byte, Apr. 1995, pp. 171-172.

Buhkan, Checkpoint Charlie, PC Week Network, Nov. 27, 1995, pp. N1, N6-N7.

Process Software Technical Support Page, found on http://www.process.com/techsupport/whitesec.html, printed off of the Process Software website on Feb. 26, 2003, pp. 1-5.

Ganesan, BAfirewall: A Modern Firewall Design, Proceedings Internet Society Symposium on Network and Distributed System Security 1994, Internet Soc., 1994, pp. 99-108.

Lee, Trusted Systems, Chapter II-1-6 of Handbook of Information Security Management, Ed. Zella G. Ruthberg and Harold F. Tipton, Auerbach, Boston and New York, 1993, pp. 345-362.

Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.

Guha et al., Network Security via Reverse Engineering of TCP Code: Vulnerability Analysis and Proposed Solution, IEEE, Mar. 1996, pp. 603-610.

Garg et al., High Level Communication Primitives for Concurrent Systems, IEEE, 1988, pp. 92-99.

Hastings et al., TCP/IP Spoofing Fundamentals, IEEE, May 1996, pp. 218-224.

Snapp, Signature Analysis and Communication Issues in a Distributed Intrusion Detection System, Master Thesis, University of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Sammons, Nathaniel, "Multi-platform Interrogation and Reporting with Rscan," The Ninth Systems Administration Conference, LISA 1995, Monterrey, California, Sep. 17-22, 1995, pp. 75-87.

Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10th Annual Computer Security Applications Conference, Dec. 5-9, 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18th National Information Systems Security Conference, Oct. 10-13, 1995, Baltimore, Maryland, pp. 83-99.

Epstein et al., "Component Architectures for Trusted Netware," 18th National Information Systems Security Conference, Oct. 10-13, 1995, Baltimore, Maryland, pp. 455-463.

Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype," 14th National Computer Security Conference, Oct. 1-4, 1991, Washington, DC, pp. 167-176.

Broner et al., "IntelligentI/O Rule-Based Input/Output Processing for Operating Systems," Operating Systems Review, vol. 25, No. 3, Jul. 1991, pp. 10-26.

Drews et al., "Special Delivery—Automatic Software Distribution Can Make You A Hero," Network Computing, Aug. 1, 1994, pp. 80, 82-86, 89, 91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.

Anderson, Paul, "Towards a High-Level Machine Configuration System," Proceedings of the Eighth Systems Administration Conference (LISA VIII), Sep. 19-23, 1994, San Diego, California, pp. 19-26.

Cooper, Michael A., "Overhauling Rdist for the '90s," Proceedings of the Sixth Systems Administration Conference (LISA VI), Oct. 19-23, 1992, Long Beach, California, pp. 175-188.

Vangala et al., "Software Distribution and Management in a Networked Environment," Proceedings of the Sixth Systems Administration Conference, Oct. 19-23, 1992, Long Beach, California, pp. 163-170.

Kim et al., "The Design and Implementation of Tripwire: A File System Integrity Checker," 2nd ACM Conference on Computer and Communications Security, Nov. 2-4, 1994, Fairfax, Virginia, pp. 18-29.

Winn Schwartau, "e.Security™ -Solding 'Dumb Days' With Security Visualization," e-Security, Inc., Naples, FL 34103, 2000.

Anita D'Amico, Ph.D., "Assessment of Open e-Security Platform™: Vendor-Independent Central Management of Computer Security Resources," Applied Visions, Inc., 1999.

"e.Security™ -Open Enterprise Security Management: Delivering an integrated, automated, centrally Managed Solution You Can Leverage Today and Tomorrow," e-Security, Inc., Naples, FL 34102, 1999.

"e.Security™ -Vision," e-Security, Inc., Naples, FL, 1999.

"e.Security™ -Administrator Workbench™ ," e-Security, Inc. Naples, FL, 1999.

"e.Security™ -Fact Sheet," e-Security, Inc., Naples, FL, 1999.

"e.Security™ -Open e-Security Platform™ ," e-Security, Inc. Naples, FL, 1999.

Babcock, "E-Security Tackles The Enterprise," Jul. 28, 1999; Inter@ctive Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www. InformationWeek.com.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Cutler, Inside Windows NT, 1993, Microsoft Press.

Duncan, Advanced MS-Dos, 1986, Microsoft Press.

McDaniel, IBM Dictionary of Computing, 1994, International Business Corporation.

Burd, Systems Architecture, 1998, Course Technology, Second Edition.

Programmer's Guide PowerJ, 1997, Sybase.

Express Storehouse Ordering System, "Accessing ESOS through the Network", http://www-bfs.ucsd.edu/mss/esos/man3.html, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

International Search Report for PCT/US99/29117 of May 2, 2000.

Nordin, U of MN OIT Security and Assurance, Feb. 9, 2000.

Internet Security Systems, RealSecure SireProtector, SAFEsuite Decisions to SiteProtector Migration, Aug. 8, 2003, pp. 1-42.

Internet Security Systems SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Networked World Fusion, http://www.fusion.com/cgi-bin/mailto/x/cgi, Apr. 21, 1999, pp. 1-2.

NetworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nw.fusion.com/cgi-bin/mailto/x.cgi, Jun. 28, 1999, pp. 1-2.

Rogers, Network ICE Touts Security Wares, Apr. 23, 1999, San Mateo, California, http://www.cm.com/showArticle.jhtml?articleID=18829106&flatPage=true, pp. 1-2.

Rogers, Network Ice Signs Resellers, May 26, 1999, San Mateo, California, http://www.cm.com/show/Article.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society'Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressroom/199....

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computer & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Life Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Application Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May. 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issues in a Distributed Intrusion Detection System, 1991, pp. 1-40.

Porras et al., Emerald: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al. Tractable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippmann et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

Emerald TCP Statitical Analyzer 1998 Evaluation Results, http://www.sdl.sri.com/projects/emerald/98-eval-estat/index.html, Jul. 9, 1999, pp. 1-15.

Staniford-Chen, GrIDs-A Graph Based Intrusion Detection System for Large Networks, Oct. 1996.

Tener, William, Discovery: An Expert System in the Commercial Data Security Environment, Dec. 1986, pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection System using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.bvte.com/art/9805/sec20/art1.htm, May 1998, pp. 1-8.

Cisco Systems, Inc., Newtork RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.

Power et al., CSI Intrusion Detection System Resource, Jul. 1998, pp. 1-7.

Cisco Systems, Inc., NetRanger User's Guide Version 2.1.1, 1998.

Internet Security Systems, Real-Time Attack Recognition and Response: A Solution for Tightening Network Security, http://www.iss.net, 1997, pp. 1-13.

Network ICE Corporation, Network ICE Product Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/support/docs.htm, Jul. 6, 2004.

Network ICE Corporation, Network ICE Press Release, p. 1, http://www.web.archive.org/web/19990903214428/www.netice.com/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, 14th Annual Conference Proceedings, pp. (17)25-17(45), May 1991.

Staniford-Chen et al., GrIDs-A Graph Based Intrusion Detection System for Large Networks, University of California, Davis, California, 19th National Information Systems Security Conference, 1996, pp. 1-10.

Ricciulli et al., Modeling Correlated Alarms in Network Management Systems, SRI International, Menlo Park, California, , Proceedings of the Conference on Communication Networks and Distributed System Modeling and Simulaton, 1997, pp. 1-8.

Porras et al., Emerald: Event Monitoring Enabling Responses to Anomalous Live Disturbances, SRI International, Menlo Park, California, 20th National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55$a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b....

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods for Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.

Anderson et al., In Athena's Camp: Preparing for Conflict in the Information Age, An Exploration of Cyberspace Security R&D Investment Strategies for DARPA: The Day After-in Cyberspace II, Chapter Eleven, 1996, pp. 253-271.

Valdes et al., SRI International, Probabilistic Alert Correlation, 2001, pp. 1-15.
Bass, Multisensor Data Fusion for Next Generation Distributed Intrusion Detection Systems, Apr. 28, 1999, Iris National Symposium, pp. 1-6.
Perrochon et al., Enlisting Event Patterns for Cyber Battlefield Awareness, No Date, Stanford University, pp. 1-12.
Perrochon, Using Context-Based Correlation in Network Operations and Management, Jul. 2, 1999, Stanford University, pp. 1-20.
Perrochon, Real Time Event Based Analysis of Complex Systems, Jun. 1998, pp. 1-9.
Luckham et al., Complex Event Processing in Distributed Systems, Aug. 18, 1988, Stanford University, pp. 1-26.
Pettigrew, US Southcom United States Southern Command's Information Sharing Projects, Summer 1999, IAnewsletter, vol. 3, No. 1, pp. 1-24.
Levitt et al., CMAD IV, Computer Misuse & Anomaly Detection, Session Summaries, Nov. 12-14, 1996, Proceedings of the Fourth Workshop on Future Directions in Computer Misuses and Anomaly Detection, Monterey, California, pp. 1-86.
Cheung et al., The Design of GrIDS: A Graph-Based Intrusion Detection System, Jan. 26, 1999, University of California, pp. 1-51.
Cohen et al., Report of the Reporting and Analysis Track, Detection of Malicious Code, Intrusions, and Anomalous Activities Workshop, Feb. 22-23, 1999, pp. 1-47.
Garofalakis et al., Network Mining Analysis: The Nemesis Project, Bell Labs, Lucent Technologies, No Date, pp. 1-12.
RealSecure ICEcap Manager User Guide Version 3.6, Internet Security Systems, Inc., 1998-2002, pp. 1-228.
Cuppens, Cooperative Intrusion Detection, Date Unknown, pp. 1-10.
Mukherjee et al., Network Intrusion Detection, IEEE Network, May/Jun. 1994, pp. 26-41.
Machlis, Net Monitoring Tools Gain Real-Time Alerts, Apr. 14, 1997, http://www.computerworld.com, pp. 1-12.
OmniGuard/ITA Intruder Alert, AXENT Technologies, Inc., Nov. 17, 2004, http://www.web.archive.org, pp. 1-10.
NetRanger Overview, Chapter 1, Date Unknown, pp. 1-16.
Sutterfield, Large-Scale Network Intrusion Detection, 1997, WheelGroup Corporation, pp. 1-10.
Kumar et al., An Application of Pattern Matching in Intrusion Detection, Technical Report No. CSD-TR-94-013, Jun. 17, 1994, Purdue University, pp. 1-55.
Huang et al., A Large-Scale Distributed Intrusion Detection Framework Based on Attack Strategy Analysis, Date Unknown, The Boeing Company, pp. 1-12.
Perrochon et al., Event Mining wtih Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX A User Guide and Reference Manual, 1997, Internet Security Systems, Inc., pp. 1-92.
Internet Security Safe Safesuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronics CIPHER, Nov. 25, 1997, Issue 25, pp. 1-34.
20th National Information Systems Security Conference, Oct. 6-10, 1997, Baltimore, Maryland, pp. 1-44.
Emerald Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference on Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporation, pp. 1-25.
Shulak et al., ICEcap Advanced Administration Guide Version 3.0, 2001, Internet Security Systems Corporation, pp. 1-51.
"Real Secure, OS Sensor User Guide," Version 5.0, © Internet Security Systems, Inc. 199?-2000; Sep. 2000, pp. 1-64.
"Real Secure, User's Guide," Version 3.0, © 1992-1998, Internet Security Systems, Inc., pp. 1-128.
"Systems Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, , © 1999 by Internet Security Systems, Inc., pp. 1-164.
"Real Secure ™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"Safesuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"Safesuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"System Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.

Internet Security Systems, Inc., "Introduction to RealSecure Version 5.0, The Industry's Only Integrated Host-Based and Network-Based Intrusion Detection System", Aug. 22, 2000, pp. 1-47.

Internet Security Systems, Inc., "RealSecure Network Sensor and Gigabit Network Sensor Policy Guide Version 7.0", Aug. 2003, pp. 1-86.

Internet Security Systems, Inc., "RealSecure Console User Guide Version 3.1", Jun. 1999, pp. 1-98.

Internet Security Systems, Inc., "RealSecure Version 2.0", Apr. 1998, pp. 1-154.

Internet Security Systems, Inc., "Enhanced Dynamic Threat Protection via Automated Correlation and Analysis", an ISS White Paper, 2002, pp. 1-14.

Internet Security Systems, Inc., "RealSecure Site Protector Comparison Guide for Internet Scanner 7.0 Reporting Version 1.2", Mar. 2003, an ISS Tech Note, pp. 1-15.

Internet Security Systems, Inc., "RealSecure Site Protector Comparison Guide for ICEcap Manager Version 1.5", Jan. 2002, an ISS Technical White Paper, pp. 1-27.

Internet Security Systems, Inc., "RealSecure SiteProtector Security Fusion Module 2.0 Frequently Asked Questions", Mar. 2003, pp. 1-8.

Internet Security Systems, Inc., "RealSecure SiteProtector Console User Reference Guide Version 2.0 Service Pack 1", Mar. 14, 2003, Chapter 3, pp. 1-27.

Internet Security Systems, Inc., "Proventia Gateway and Network Protection", Jul. 2003, pp. 1-12.

Farley, Internet Security System, Inc., "ID Fusion Technology, A First-Generation Approach", Apr. 29, 1999, National Security Framework Forum, pp. 1-8.

Farley, "RealSecure Fusion Enginer Concepts", an ISS White Paper, Jun. 30, 1999, pp. 1-23.

McGraw et al., "Secure Computing with Java: Now and the Future", 1997, http://java.sun.com/security/javaone97-whitepaper.html, pp. 1-20.

H.S. Vaccaro, et al., "Detection of anomalous computer session activity," Security and Privacy, 1989, Proceedings., 1989 IEEE Symposium on May 1-3, 1989. pp. 280-289. [Pertinent pp. 284-288, Section V].

Frédéric Cuppens, "Cooperative Intrusion Detection", ONERA Centre de Toulouse (Funded by the DGA/CASSI) (No Date), France. [Pertinent pp. 2-9, paragraphs 2-7].

Sandeep Kumar, et al., "An Application of Pattern Matching in Intrusion Detection," Technical Report 94—13, Department of Computer Sciences, Purdue University, Mar. 1994, http://citeseer.ist.psu.edu/humar94application.html. [Pertinent pp. 26-32, paragraph 5].

Nathaniel Sammons, "Multi-platform Interrogation and Reporting with Rscan," Ninth System Administration Conference (LISA '95), http://www.usenix.org/publications/library/proceedings/lisa95/full_papers/sammons.pdf. [Pertinent p. 75, Abstract].

T.C.V. Benzel, et al., "Identification of Subjects and Objects in a Trusted Extensible Client Server Architecture," In Proceedings of the 18th National Information Systems Security Conference, pp. 83-93, 1995. [Pertinent pp. 85-90, Secton 2].

Jieh-Sheng Lee, et al., "A Genetic Virus Detection Agent on the Internet," Systems Sciences, 1997, Proceedings of the Thirtieth Hawaii International Conference on vol. 4, Jan. 7-10, 1997, pp. 210-219, vol. 4 [Pertinent pp. 213-217, Section III].

Baudouin Le Charlier, et al., "Dynamic Detection and Classification of Computer Viruses Using General Behavior Patterns," Proceedings of the Fifth International Virus Bulletin Conference, 75-88. Virus Bulletin Ltd., 1995. [Pertinent pp. 6-10, Section 3].

"Advanced Virus Detection Technology for the Next Millennium," Aug. 1999, Network Associates, A Network Associates Executive White Paper, pp. 1-14. [Pertinent pp. 8-10, Polymorphic Virus Detection].

"Enterprise-Grade Anti-Virus Automation in the 21st Century," Symantec Enterprise Security Solution, http://cnscenter.future.co.kr/resource/rsc-center/vendor-wp/symantec/DIS_ScanDeliverWP.pdf. [Pertinent pp. 14-17, The Next Generation . . . ], Year: 2000.

Jeffrey O. Kephart, "A Biologically Inspired Immune System for Computers," Artificial Life IV, Proceedings of the Fourth International Workshop on Synthesis and Simulation of Living Systems, pp. 130-130, 1994. [Pertinent pp. 138, paragraph 3.5].

"Understanding Heuristics: Symantec's Bloodhound Technology," Symantec White Paper Series, vol. XXXIV. [Pertinent pp. 6-9, Figure 7], year 1997.

Carey Stover Nacehnberg, "A New Technique for Detecting Polymorphic Computer Viruses," University of California, Los Angeles, 1995; pp. 1-132. [Pertinent pp. 70-93, Chapter 6].

"Norman Introduces a New Technique of Eliminating New Computer Viruses," Lysaker, Oct. 25, 2001, http://www.norman.com/News/press_releases/2001/3750/en. [Pertinent pp. 1-2, First in the World].

K. Natvig, "Sandbox Technology Inside AV Scanners," Proceedings of the 2001 Virus Bulletin Conference, pp. 475-487. Virus Bulletin, Sep. 2001. [Pertinent pp. 476-484].

Andy Padawer, "Microsoft P-Code Technology," Created: Apr. 1992, http://msdn.microsoft.com/archive/default.asp?url=/archive/en-us/dnarcv/html/msdn_c7pcode2.asp [Pertinent pp. 1-4].

Sean Hao, "Software protects e-commerce—e-Security's product alerts networks when hackers attack," Florida Today, Florida, year 2002.

Scott Weiss, "Security Strategies—E-Security, Inc.," product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

"e.Security—Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pp. (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom, year 2000.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74, year 2005.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, pp. 1.

Temin, Case Study: The IA: Aide System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Frans Veldman, "Heuristic Anti-Virus Technology," Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Carey Stover Nachenberg, "A New Technique for Detecting Polymorphic Computer Viruses," A thesis submitted in partial satisfaction of the requirements for the degree Master of Science in Computer Science, University of California Los Angeles, pp. I-127, 1995.

* cited by examiner

B.D.L*1 = Behavior Description Language

COMPUTER IMMUNE SYSTEM AND METHOD FOR DETECTING UNWANTED CODE IN A P-CODE OR PARTIALLY COMPILED NATIVE-CODE PROGRAM EXECUTING WITHIN A VIRTUAL MACHINE

BACKGROUND OF THE INVENTION

1. Field of the Invention

The present invention relates to the field of computer security and specifically to the analysis of P-code and partially compiled computer programs of the type that execute within a run-time virtual environment, and more specifically to the detection of such programs that exhibit malicious or self-propagating behavior including computer viruses, network worms and Trojans.

2. Discussion of the Related Art

Detection of malicious programs has been a concern throughout the era of the personal computer. With the growth of communication networks such as the Internet and increasing interchange of data, including the rapid growth in the use of e-mail for communications, the infection of computers through communications or file exchange is an increasingly significant consideration. Infections take various forms, but are typically related to computer viruses, Internet or other network worms, Trojan programs or other forms of malicious code. Recent incidents of e-mail mediated attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Improved strategies for detecting and dealing with virus attacks are desired.

One conventional technique for detecting computer viruses (including Internet worms and Trojans) is signature scanning. Signature scanning systems use sample code patterns extracted from known malicious code and scan for the occurrence of these patterns in other program code. In some cases program code that is scanned is first decrypted through emulation, and the resulting code is scanned for signatures or function signatures (footprints). A primary limitation of this signature scanning method is that only known malicious code is detected, that is, only code that matches the stored sample signatures of known malicious code is identified as being infected. All viruses or malicious code not previously identified and all viruses or malicious code created after the last update to the signature database will not be detected. Thus, newly created viruses are not detected by this method; neither is malicious code in which the signature, previously extracted and contained in the signature database, has been overwritten.

In addition, the signature analysis technique fails to identify the presence of a virus if the signature is not aligned in the code in the expected fashion. Alternately, the authors of a virus may obscure the identity of the virus by opcode substitution or by inserting dummy or random code into virus functions. Nonsense code can be inserted that alters the signature of the virus to a sufficient extent as to be undetectable by a signature-scanning program, without diminishing the ability of the virus to propagate and deliver its payload. In addition, signature scanning fails where malicious programs have similar code structure to benign application programs. In such a case, the signature scanner will generate large numbers of false positives, or fail to detect the malicious code if the signature is abandoned.

An example of the signature scanner technique generating large numbers of false positives involves the analysis of malicious or potentially malicious code produced by a compiler that produces P-code or N-code. P-code or pseudocode is compiled and executable within a virtual machine environment. P-code is used in such languages as Java and is compiled to a form that is executable within an appropriate virtual machine in a host computer. N-code is partially compiled native code that requires a run-time environment for execution. Both P-code and N-code are executable within a virtual machine environment and the event procedures constructed by these compilers have a high degree of similarity whether the code is malicious or ordinary. Consequently, signature scanning tends to identify a large number of false positives for P-code and N-code programs.

Another virus detection strategy is integrity checking. Integrity checking systems extract a code sample from known, benign application program code. The code sample is stored, together with information from the program file such as the executable program header and the file length, as well as the date and time of the sample. The program file is checked at regular intervals against this database to ensure that the program file has not been modified. Integrity checking programs generate long lists of modified files when a user upgrades the operating system of the computer or installs or upgrades application software. A major disadvantage of an integrity check based virus detection system is that a great many warnings of virus activity issue when any modification of an application program is performed. It is difficult for a user to determine when a warning represents a legitimate attack on the computer system. Another drawback of the integrity checking method is that malicious code must modify other files to be detectable and the method therefore only works with computer viruses, not other forms of malicious code such as Internet worms and Trojan programs which do not alter other program files. Yet another disadvantage of the integrity checking method is that the virus has to be activated on the target system, that is, running in memory and performing its infection function on the target computer's files in order to be detectable, since changes to files only occur after the virus is activated.

Checksum monitoring systems detect viruses by generating a cyclic redundancy check (CRC) value for each program file. Modification of the program file changes the CRC value for that file and it is that change that indicates infection of the program file. Checksum monitors improve on integrity check systems in that it is more difficult for malicious code to defeat the monitoring. On the other hand, checksum monitors exhibit the same limitations as integrity checking in that the method generates many false positives.

Behavior interception systems detect virus activity by interacting with the operating system of the target computer and monitoring for potentially malicious behavior. When such malicious behavior is detected, the action is blocked and the user is informed that a potentially dangerous action is about to take place. The potentially malicious code can be allowed to perform this action by the user. This makes the behavior interception system somewhat unreliable, because the effectiveness of the system depends on user input. In addition, resident behavior interception systems are sometimes detected and disabled by malicious code.

Another conventional strategy for detecting infections is the use of bait files. This strategy is typically used in combination with other virus detection strategies to detect an existing and active infection. This means that the malicious code is presently running on the target computer and is modifying files. The virus is detected when the bait file is modified. Many viruses are aware of bait files and do not modify files that are either too small, obviously a bait file because of their structure or that have a predetermined content in the file name.

Another virus detection method is known as sand-boxing. This method is based on the fact that normal programs interact with the operating system through a set of pre-defined entry points referred to as API calls (application program interface calls). The API calls are made to procedures located in memory whose entry points are maintained by the operating system and stored in an API table. Such an API table is present in each program space created under the operating system. In the sand-boxing method, the API table is replaced (in the program's process space only) with an API table that consists of pointers to the anti-virus protection shell which then monitors each API call before passing the call to the real operating system API address. This method also has the drawback that the malicious code has to be activated on the target computer's platform before detection can take place. Another drawback of this method is that it works only for those programs that employ the documented manner of calling the system's API's. Many programs containing malicious code, including viruses, Internet worms and Trojans do not follow the standard convention and directly call the operating system at an address determined by scanning the operating system memory for an export table contained within the kernel32 and other standard system DLLs. Such programs are capable of immediately infecting the target computer during the sand-box examination process.

It is apparent that improved techniques for detecting viruses and other malicious types of code are desirable.

SUMMARY OF THE PREFERRED EMBODIMENTS

An aspect of the present invention provides a method for identifying the presence of malicious code in program code within a computer system. The method includes initializing an analytical virtual P-code engine (AVPE) within the computer system. P-code is virtual machine code, whereby a run-time engine is required to interpret the P-code for execution. The run-time engine translates each P-code to one or more instructions in machine code. The AVPE comprises software simulating functionality of a P-code interpreter and exposes a set of library routines for N-code compiled programs, where a virtual central processing unit and virtual memory perform the actual processing. A target program is virtually executed within the AVPE so that the target program interacts with the computer system only through the AVPE and the virtual central processing unit. The behavior of the target program is analyzed following virtual execution to identify occurrence of malicious code behavior and indicating in a behavior pattern the occurrence of malicious code behavior. The AVPE is terminated after the analyzing process, thereby removing from the computer system a copy of the target program that was contained within the AVPE, including the de-allocation of all virtual memory resources containing data or program statements created by the virtualized program.

According to some implementations of this aspect, the method may deallocate all virtual memory resources containing data or program statements created by the target program.

In some other implementations of this aspect, library routines for N-code compiled programs are exposed to the AVPE through an application program interface.

In still other implementations of this aspect, P-code is virtual machine code and a run-time engine simulates the operations performed by each P-code. Another aspect of the present invention provides a method for identifying the presence of malicious code in program code within a computer system. A virtual engine is initialized within the computer system. The virtual engine comprises software simulating functionality of a central processing unit, a P-code interpreter, memory and an operating system including application program interface (API) calls to the virtual operating system and a set of API calls to the P-code engine library routines. A target program is virtually executed within the virtual engine so that the target program interacts with the virtual operating system and the virtual central processing unit through the virtual engine. The behavior of the target program is monitored during virtual execution to identify presence of malicious code and to indicate in a behavior pattern the occurrence of malicious code behavior. The virtual engine is terminated, leaving behind a record of the behavior pattern characteristic of the analyzed target program.

Still another aspect of the present invention provides a method for identifying the presence of malicious code. An analytical virtual P-code engine (AVPE) is initialized. The AVPE simulates the functionality of a P-code interpreter, the AVPE interacting with a virtual central processing unit that provides processing and virtual memory management functions. The method virtually executes a target program within the AVPE so that the target program interacts with the host computer system only through the AVPE and the virtual central processing unit. The AVPE triggers behavior bits to identify the occurrence of all I/O actions present in the program, generating a behavior pattern. The AVPE terminates and thereby removes from the host computer system a copy of the target program that was contained within the AVPE.

DETAILED DESCRIPTION OF THE PREFERRED EMBODIMENTS

Figure 1:
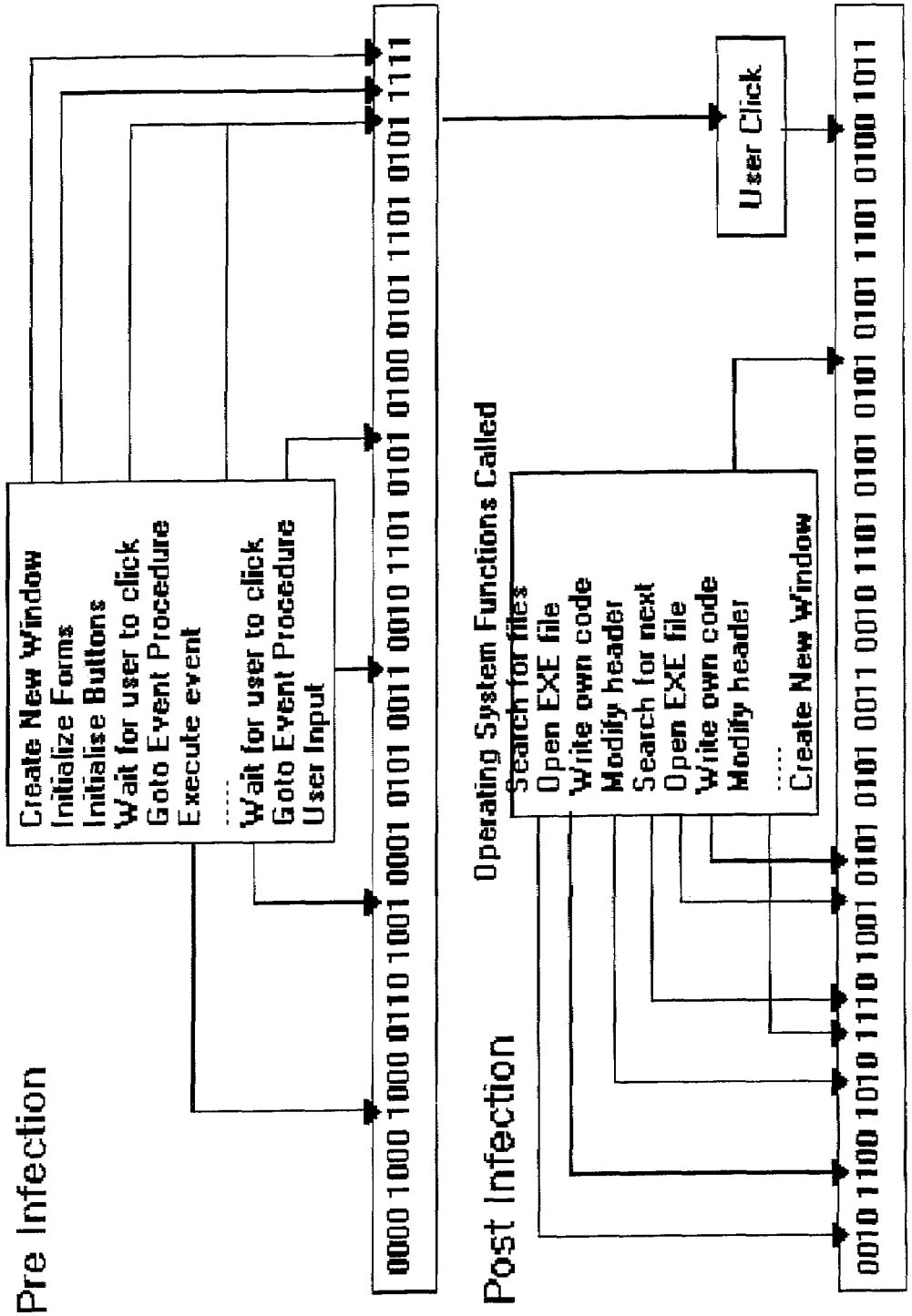
FIG. 1 illustrates behavior patterns generated according to the analytical behavior method, showing an observed behavior pattern for code that is not infected and another behavior pattern for code that is infected with a computer virus.

Significant aspects of this description relate to N-code programs and program code compiled within a computer system to an intermediate language generally referred to as P-code. P-code is virtual machine code, whereby a run-time engine is required to interpret the P-code for execution. The run-time engine simulates the operations performed by each P-code. Preferred embodiments of the present invention provide a method or apparatus for identifying the presence of malicious P-code or N-code programs in a manner that preferably limits the possibility of the malicious code infecting the target computer. Particularly preferred embodiments initialize an analytical virtual P-code engine (AVPE) within the target computer system. N-code is defined as native executable code, which requires the presence of a P-code engine to execute. The N-code is executed by accessing library routines within the P-code engine though a set of application program interface (API) calls. A number of commercial compilers generate such N-code executable programs. The produced code will not function unless the P-code engine for that language is present on the target computer platform. It is consequently particularly preferred that the initialized AVPE comprises software that simulates the functionality of a P-code or intermediate language engine and memory as well as machine language facilities that simulate the P-code (API) library routines that allow the execution of N-code programs.

Most preferably the AVPE executes a P-code target program so that the target program interacts only with the AVPE. Alternately, an N-code program may interact only with the AVPE and a virtual processing unit. The analytic behavior method analyzes the behavior of the target program following virtual execution to identify occurrence of malicious code behavior and indicate in a behavior pattern the occurrence of malicious code behavior. In preferred embodiments the behavior pattern is stored in a behavior data structure and the behavior observed in the program is recorded as a sequence of symbols representative of the observed behaviors. Particularly preferred embodiments of the present invention provide a behavior description language for more accurate characterization of the observed behavior. The AVPE preferably is terminated at the end of the analysis process, thereby removing from the computer system a copy of the target program that was contained within the AVPE.

Other embodiments of the present invention might provide a method for identifying the presence of malicious code in N-code or P-code program code within a computer system. A preferred method includes initializing an analytical virtual P-code engine (AVPE) within the computer system, where the AVPE includes software simulating functionality of a P-code or intermediate language engine, memory and an operating system including API calls to the virtual operating system. A target program execution is simulated within the AVPE so that the target program interacts with the virtual operating system through the AVPE. Behavior of the target program is monitored during virtual execution to identify presence of malicious code and the occurrence of malicious code behavior is indicated in a behavior description pattern. The AVPE is terminated, leaving behind a record of the behavior pattern characteristic of the analyzed target program.

A particularly preferred embodiment of the present invention provides an automated analysis system that detects viruses and other types of malicious code within a computer system by generating and subsequently analyzing a behavior pattern for each computer program introduced to the computer system. New or modified computer programs are analyzed before being executed by the computer system. Most preferably the computer system initiates an AVPE representing a simulation of the computer system and the AVPE executes the new or modified computer program to generate a behavior pattern prior to the new computer program being executed by the physical computer system. An analysis is performed on the behavior pattern to identify infected programs upon initial presentation of the program to the computer system.

The preferred behavior description language implementation of the behavior pattern stores data associated with each action undertaken by the unknown program. Analysis takes place by evaluating a set of actions, the data and the sequence in which these actions have been executed. For instance, an action of writing a data file with data indicates a legitimate operation. A write action to a system file, which inserts code into such a system file and most particularly when the new program writes its own code into the system file, may indicate an infection of the system file. If such an action is followed by the new program patching the system file header to modify the program's entry point then the malicious infection of a system file is considered as confirmed. This analysis takes place outside the AVPE and, in the presently contemplated implementation is not considered part of the AVPE. This allows the analysis of potentially malicious code to be conducted outside the AVPE environment and so would not be subject to interference from the potentially malicious code.

A variety of different terms are used in programming to describe different functional programming subunits. At different times and for different programming languages subunits of various sorts have been called applets, servlets, objects, functions, routines, subprograms, subroutines and other names. Such designations and the context or differences they represent are not significant to the present discussion and so this discussion is made simply in terms of programs, intending the term program to refer to functional programming units of any size that are sufficient to perform a defined task within a computer system or computing environment.

For convenience and brevity, this discussion references viruses in the known sense of that term as being a self-propagating program generally undesired in the infected computer system. In general, the term 'virus' covers all types of malicious code. Trojans are sometimes referenced separately and are referenced in the known sense of an application program that contains hidden within the body of that program a malicious subroutine or a payload that may cause damage to other software, hardware or information stored within the hardware of the computer system or its peripheral equipment. Trojans may or may not replicate automatically, and may be passed on by human interaction as joke programs or games. Similarly, "worms" are also sometimes discussed separately and sometimes within the overall description of a virus. The term "worm" refers to a program that replicates across a network connection set up between computer systems and infects computer systems connected to such a network by inserting itself within the set of programs that comprise the operating system of that computer system or the programs that are started during the initialization of the operating system. As used here, the term Windows is intended to reference any of the personal desktop operating systems sold by the Microsoft Corporation under the Windows brand name. The term PC or personal computer is used, unless specifically modified to indicate otherwise, to indicate a computer system based on the well-known x86 architecture, including those machines that presently are based on microprocessors sold by Intel Corporation under its Pentium brand name and successors to that microprocessor and architecture. This discussion is provided to illustrate implementation of aspects of the invention. Aspects of the present invention find application in a range of different computer systems in addition to the illustrated personal computer systems.

The present inventor has analyzed the behavior of a variety of different viruses and other malignant code including P-code of the type associated with Visual Basic and including N-code programs. Certain general characteristics of viruses have been identified. A virus needs to infect other programs and eventually other computers to propagate. Worms generally replicate over network connections by scanning the network for open connections, or though the email system. Worms and Trojans generally contain payloads. The payload allows the Trojan or worm to affect the infected system or communicate its presence. A payload might be, for example, a tool that monitors Internet traffic and keyboard entries to spy on passwords and mail those passwords to an anonymous email address or a malicious function that damages the infected computer, for example by corrupting or erasing the data on the hard disk or by altering or disabling the BIOS within the BIOS flash or EEPROM.

These behaviors are characteristic of a virus and are not, in the aggregate, characteristic of other, non-malignant programs. Consequently, a program can be identified as a virus or infected with a virus if it possesses certain ones of these behaviors, certain collections of these behaviors or all of these behaviors. In preferred embodiments of the present invention, the occurrence of these behaviors or combinations of the behaviors is indicated by collections of bits in a behavior pattern data set representing behavior characteristic of the infected program. An example of bit-based behavior patterns for a normal and an infected file are illustrated in FIG. 1.

FIG. 1 illustrates a behavior pattern generated according to the analytical behavior method, showing the behavior pattern for code that is not infected (above) and for code that is infected with a computer virus (below). Both of the illustrated behavior patterns are derived by virtually executing the respective uninfected and infected programs within an AVPE (P-code) and a virtual central processing unit (N-code). Corresponding portions of the uninfected and infected codes are illustrated along with corresponding portions of a behavior pattern for each program. The behavior pattern is, in the illustrated embodiment, a bit pattern where each bit may be a flag indicating an action. The total stream of bits is a value indicative of the behavior of the program observed over the virtual execution of the program. The illustrated behavior patterns are generated through the virtual execution of the respective programs within the analytical virtual P-code engine. In some embodiments of the invention, the sequence in which the flags are set is recorded to provide further description and characterization within the behavior pattern. In alternate and presently preferred embodiments the behavior pattern is an array of symbols or objects from a behavior description language including the order in which the behavior description language are generated and a sample of the data that was manipulated. This much richer data structure provides far greater flexibility and information for analyzing the behavior of programs introduced into the computer system.

In the illustration of FIG. 1 the virus has added a sequence of actions to the functionality of the original program that are atypical of normal program actions and are characteristic of malicious code. The change in program actions is clearly indicated in the behavior patterns for the respective pre- and post-infection programs. For example, in the behavior pattern for the uninfected program there is a bit corresponding to a user click, i.e., the program requires a user to respond to a message by performing a mouse click and the occurrence of that click is recorded by a true flag or one valued bit. In the infected program there is no longer a prompt for user input and the flag in the behavior pattern is false or a zero valued bit, reflecting the fact that there was no prompt for user input and no mouse click recorded.

In preferred embodiments of the present invention, the behavior of newly loaded or called P-code programs is determined in an analytical virtual P-code engine (AVPE) that simulates in software a complete PC, or a sufficiently complete PC, and it is that virtual PC that generates the behavior pattern for later analysis within an analysis module. In some implementations the AVPE may include a virtual central processing unit and in other implementations the AVPE may cooperate with a virtual central processing unit. Generally the virtual PC includes both the AVPE and the virtual central processing unit to simulate the execution of N-code programs. The virtual PC simulates execution of the new or modified program, simulating a range of system functions, and the virtual PC monitors the behavior of the suspect program and makes a record of this behavior that can be analyzed to determine whether the target program exhibits virus or malignant behaviors. The result of the virtual execution by the AVPE is a behavior pattern representative of the program. As discussed in greater detail below, the behavior pattern generated by the virtual PC identifies that a program is infected with a virus or is itself a virus.

An advantage for the use of virtual execution and analysis of new programs for viruses is that the AVPE is virtual and so, if the virtualized new program contains a virus, only the totally isolated AVPE environment is infected. The infected instance of the AVPE most preferably is deleted after the simulation, so the infection is ineffective and the virus does not propagate. Most preferably the virtual CPU, whether within the AVPE or associated with the AVPE, is also deleted so that infection of the virtual CPU is also ineffective. Preferably after the analyzing process the system deallocates all virtual memory resources containing data or program statements created by the virtualized program. The behavior pattern survives the deletion of the AVPE, allowing an analysis program to identify the existence of the virus and of the infection within the new program.

Most preferably, each time a new program is analyzed a new instance of the AVPE is generated, free of modification by any previously virtualized programs including any earlier analyzed viruses. The new program then is run on the new instance of the AVPE preferably followed by initiation of a modified interrupt caller procedure, as described in greater detail below. While the AVPE is executing the new program, the AVPE preferably monitors all decryption loops, operating system calls, DPMI/DOS interrupts and I/O port read/write (r/w) operations, setting bits in the behavior pattern register according to the observed behaviors. It is these bits in the behavior pattern that are retained after the simulation is complete and the virtual PC has been terminated. The bits stored in the behavior pattern register are the behavior pattern and subsequent analysis indicates whether the virtually executed program includes behaviors indicative of the presence of a virus or other malignant code. In other presently preferred implementations, the behaviors are recorded in a more descriptive, object-oriented behavior description language.

The modified interrupt caller procedure calls interrupts that the program being analyzed has modified within the virtual PC and generates a behavior pattern for each of those interrupt service routines as well. This allows particularly preferred embodiments of the present invention to identify certain types of viruses that initially modify only the interrupt service routines and do not begin propagating until the modified interrupt or interrupts are called by another program. By allowing the various interrupt service routines in the AVPE to be modified and then analyzing the modified interrupts, these embodiments of the invention can detect this delayed propagation mechanism. The same is true for viruses that plant a program within the computer's file system and modify the operating system registry to begin execution of that program after the next time the computer is restarted. Programs created by the program in this manner will spawn another virtual PC containing the newly created program. The newly created program will be virtualized in the usual manner, as described in the ABM (analytical behavior method) application, but the behavior pattern preferably is stored as a 'child' of the 'parent' behavior pattern representing the first program. The ABM is described in U.S. patent application Ser. No. 09/642,625, filed Aug. 18, 2000 and entitled "Computer Immune System and Method for Detecting Unwanted Code in a Computer System," which application is incorporated by reference in its entirety.

In some embodiments, only the static, final version of the behavior pattern is analyzed. It is possible, and in many circumstances desirable, to monitor the sequence in which the bits in the behavior pattern register are set. The order in which the behavior pattern bits are set provides additional information allowing identification of additional virus behaviors. Tracking of the order in which the behavior pattern bits are set is accomplished within the AVPE. Further information can be recorded using a more complex behavior data structure and a behavior description language that can more precisely identify behaviors that occur.

Preferred implementations of the analytical behavior method (ABM) proceed by extracting a behavior pattern and sequence from a modified, new, unknown or suspect program, for example using an instance of the AVPE. The behavior pattern is preferably used to analyze the behavior of the unknown program to determine if the behavior of the unknown program is malicious. Identification of malicious behavior in this manner allows identification of virus carrying files prior to infection of the host computer system. The behavior pattern can also be stored in a database and the AVPE can subsequently analyze the behavior of the program following modification to determine if its functionality has been modified in a suspect (malicious) manner. This provides post-infection analysis.

The described analytical behavior method differs from conventional virus detection methods in that it does not match program code to a set of stored patterns as do signature scanners and integrity checkers. Rather, an AVPE is used to generate a behavior pattern and, in particularly preferred embodiments, a sequence of flags within that behavior pattern or a sequence of behavior patterns. The generated behavior pattern does not change significantly between program version updates, but does change dramatically when a virus infects a program. For example, a word processor will still behave like a word processor when the program is replaced or updated with a new version of the program but the word processor changes significantly when the word processor is infected with a virus. The differences reflected in the behavior patterns are illustrated in FIG. 1. When a word processor is infected with a file infector computer virus, the word processor now opens executable files and inserts the viral code into them, thereby infecting additional files. This is clearly reflected in the illustrated behavior patterns.

In particularly preferred embodiments of the invention, the analysis procedure specifically targets infection methods such as, but not limited to, the insertion of code into other executables or documents, submitting code to other applications to be transmitted or stored, insertion of code into high memory blocks and the modification of memory control blocks. Preferred implementations of the analysis method further look for destructive content, such as, but not limited to, functions that overwrite disk areas or the BIOS ROM, delete files or directories, modify data files or submit data to be transmitted. Most preferably, the analysis makes an exception and does not identify as infected a program whose other behavior characteristics indicate that the program is a development tool or software debugging tool and where the modifying behavior is an integral part of the tool's normal function. A viral infection of a development tool can be detected where an expressed function is not part of the tool's normal function, that is, within the development process. Both active (1) and inactive (0) flags present in the behavior pattern may be significant in this analysis, as well as the sequence in which actions take place (i.e., the order in which flag values are changed).

In accordance with preferred embodiments of the present invention, the AVPE or virtual PC represents a simulation of a complete computer system. A complete computer system preferably includes an emulated central processing unit (CPU), emulated memory, input/output (I/O) ports, BIOS firmware, operating system and the operating system data areas, as well as high level engines such as the AVPE and other language emulators. This stands in contrast to the simple emulation of a processor, in which only the processor processes are emulated. In emulation, program instructions are converted from their native form to a stream of instructions that perform the same function on a different hardware platform. Some signature scanning software employs emulation to decrypt the body of a suspect program before the suspect program is scanned for signatures. In virtualization, the entire computer is simulated including operating system calls, which are not actually executed but seem to the calling program to perform the desired functions and return the correct values as if they were executed.

As discussed above, the virtual PC includes a CPU, memory, I/O ports, a program loader, and the operating system application program interface (API) entry points, high level language engines and interface. Using such a complete virtual PC is particularly preferred because it gives the analytical behavior method a high level of control over the virtualized program, including over the sophisticated direct calls to the operating system API. Operating system memory areas and the IAT (import address table) preferably are simulated within the virtual PC and contain address pointers at procedures within the simulated operating system. The virtualized program most preferably is not given access to any of the facilities of the physical machine, thereby avoiding the risk that a potential virus or other malicious code escapes from the controlled environment to infect the host computer system.

Figure 2:
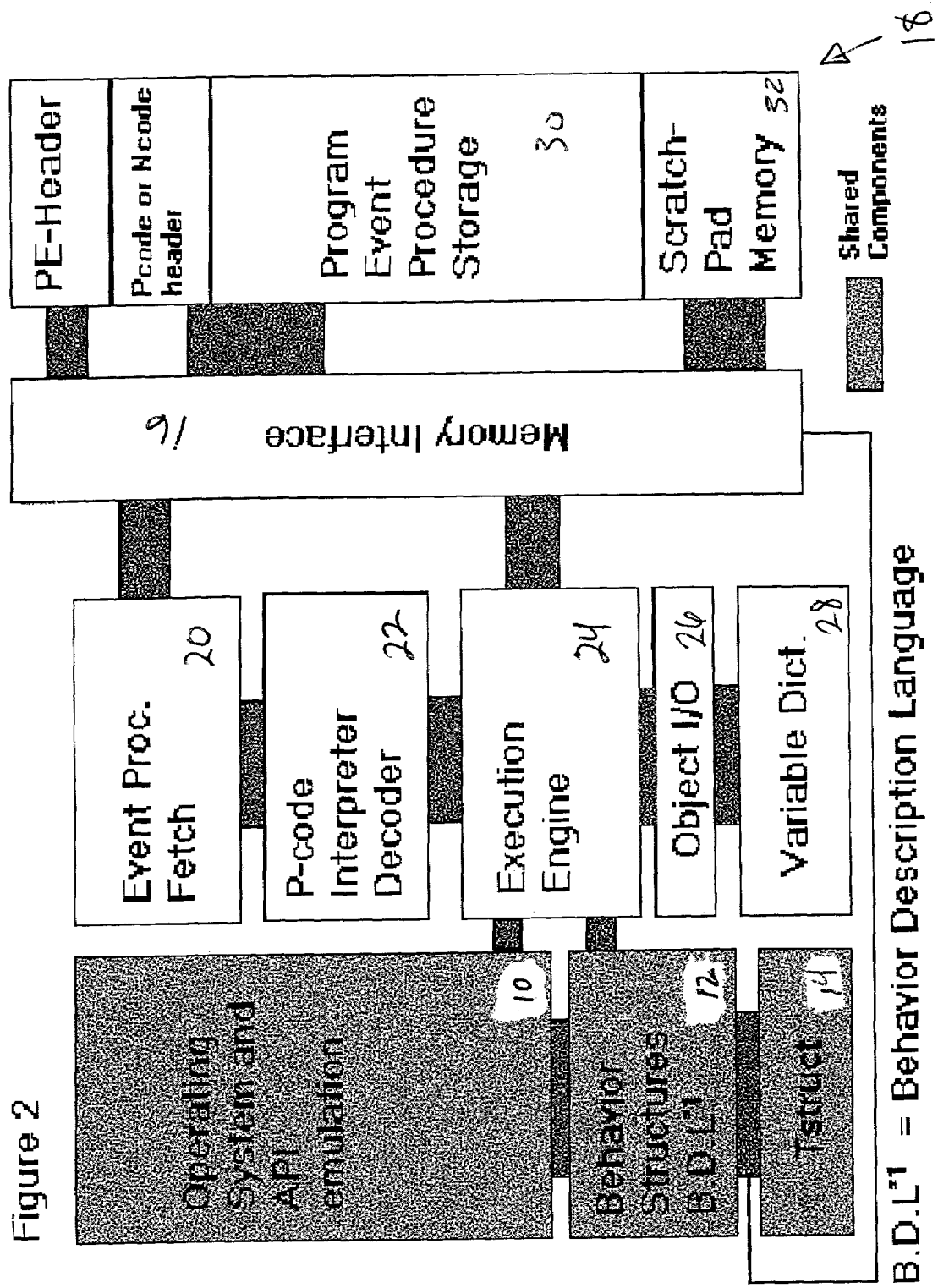
FIG. 2 is a schematic block diagram illustrating aspects of a preferred architecture implementing aspects of the analytical detection method.

FIG. 2 shows a block diagram of components used in a preferred implementation of the analytical detection method. The illustrated AVPE engine preferably fetches P-codes and executes each P-code in a virtual environment. The execution engine exists in the form of library routines that simulate the actions of the physical P-code engine. Similarly, N-code programs call functions within the P-code engine using the emulated operating system API (virtual machine operating system or VMOS) and the software CPU emulation to simulate the actions performed by the program while monitoring those actions, and build a behavior structure representative of those actions.

On the left-hand side of FIG. 2 are several components that are shared between the AVPE and the virtual CPU, including an emulation block 10 that simulates the operating system (VMOS) and application program interface (API). VMOS is the virtualization of the operating system and simulates the actual operating system. Use of the VMOS rather than the actual operating system avoids corruption or infection of the actual operating system. VMOS incorporates simulated memory areas, the IAT and a virtual file system. The analysis module of the behavior analysis program performs an analysis according to behavior previously seen in viral programs, which behavior was stored during the virtual execution of the program in the Tstruct class 12. Tstruct 12 is a class that forms part of the kernel superstructure that ties all of the components together and coordinates execution of the virtual machine. The unshaded components illustrated on the center and right hand side of FIG. 2 are portions of a P-code engine implemented in accordance with a preferred embodiment of an AVPE according to the present invention. Most aspects of the illustrated virtual P-code engine are familiar aspects of commonly used P-code engines and so are described only in summary fashion here. Additional information regarding P-code, P-code engines and their operation and implementation can be found in U.S. Pat. No. 5,590,331 to Lewis, et al., issued Dec. 31, 1996 and entitled "Method and Apparatus for Generating Platform-Standard Object Files Containing Machine-Independent Code," which patent is incorporated by reference in its entirety. Additional information can be found at the following URLS:

http://support.microsoft.com/support/kb/articles/Q229/4/15.ASP http://msdn.microsoft.com/archive/default.asp?url=/archive/en-us/dnarvc/html/msdn_c7pcode2.asp The kernel superstructure allocates the memory for the virtual PC including the virtual AVPE. Memory interface 16 represents the memory management interface to the virtual memory 18. When initiated, the AVPE allocates memory to be used as virtual memory, with additional memory being allocated as needed in blocks (or pages) of approximately 4 KB each. Generally the AVPE is a state machine running in a multi-threaded manner.

Typical programs include an initialization routine and a number of event procedures that are triggered by external actions. The virtual P-code engine includes an event procedure fetcher 20 that fetches the event procedures used by the program. Each event procedure preferably includes P-code or N-code instructions and is associated with a button or form action, such as a button click of a form load action. A preprocessor identifies the event procedures used by the program, including the entry point and the event associated with each of the event procedures, and the AVPE executes each of the event procedures used by the program to analyze the behaviors of those event procedures and hence of the P-code program. Declared variables are stored within the variable dictionary 28. The virtual P-code engine includes P-code interpreter and decoder 22 that accesses the P-codes required by the event procedures and decodes those P-codes. The decoded P-codes are virtually executed by the execution engine 24, which implements procedures simulating the execution procedures for executing the decoded P-codes. The functions for the illustrated P-code engine components are virtually executed and so do not produce actual events within the computer. Thus, if the P-code indicates that a box should be created and displayed, the function will be simulated within the code but no box will be displayed. The parameters of that box are stored within the simulated operating system so that the box can be referenced further on in the program.

Viruses including worms might access the API according to conventional schemes or may instead create an object that in turn makes an API call. Thus, it is preferred that the AVPE include an object I/O handler 26 to simulate object handling. When the target program calls an object, the AVPE preferably accesses a real version of the called object and virtualizes that object, which is then used by the AVPE to simulate the object call. This will not always be necessary or desirable, as emulations of the called object may exist and such an emulation is preferably used when it exists.

The virtual memory 18 stores the P-code program in the manner illustrated in FIG. 2, assuming that the P-code program is stored within a PE shell (PE=portable executable, based on the COFF or common object file format as described at, for example, the URL http://www.delorie.com/djgpp/doc/coff/). The PE file header stores the entry point of the program. The entry point of P-code and N-code program contains the following statements:

Push 00400789

Call MSVBVM60::ThunMain

The value following the PUSH instruction points to a location in the program that contains tables. The tables define the event procedures, forms and resources within the program. The tables also define whether the stored program is a P-code or N-code program. Following the header is storage 30 for the event procedures that are called by the program and a scratch pad memory 32 used by the execution engine. As discussed, all of this is virtual memory is accessed through the interface 16.

The analytical behavior method preferably includes: (1) file structure extraction; (2) change detection; (3) virtualization; (4) analysis; and (5) decision.

Before a program can be virtualized, the file format containing the target program preferably is evaluated. N-code or P-code compiled programs may reside in a PE-file format 'container,' an NE-file format 'container' or an executable 'container' that is in a propriety format. These formats are summarized below. The entry point code is extracted and loaded into the virtual computer's memory at the correct simulated offset. In a physical computer this function would be performed by the program loader function, as part of the operating system and the intermediate language virtual machine.

| | |
|---|---|
| Windows 3.0 executables | NE-type executable which contains both the DOS MZ-header pointing at a DOS code area and a New Executable (NE) header containing the entry point of the Windows (protected mode) code. NE files are segmented. |
| 32-bit executables | PE-type executable which contains both the DOS MZ-header and DOS code area and the Portable Executable header containing the entry point and file offset of the protected mode code. PE files are segmented. |
| Propriety format executable | A binary file image that is loaded by the AVM. |

The AVM virtual computer loader function and the virtual computer P-code engine preferably are capable of dealing with the file formats and binary image files shown above. The loader function is performed by virtualizing the operating system program loader and so varies depending on the operating system used in the host computer. The file structure analysis procedure looks in the file header and file structure to determine the file format, rather than using the file extension because file extensions are unreliable in general use. The .EXE formats described above therefore include DLL, AX, OCX and other executable file format extensions. The NE/PE/LE executable file formats are similar in complexity; these file formats use a segment or page table. The PE file format is based on the COFF file specification.

Figure 3:
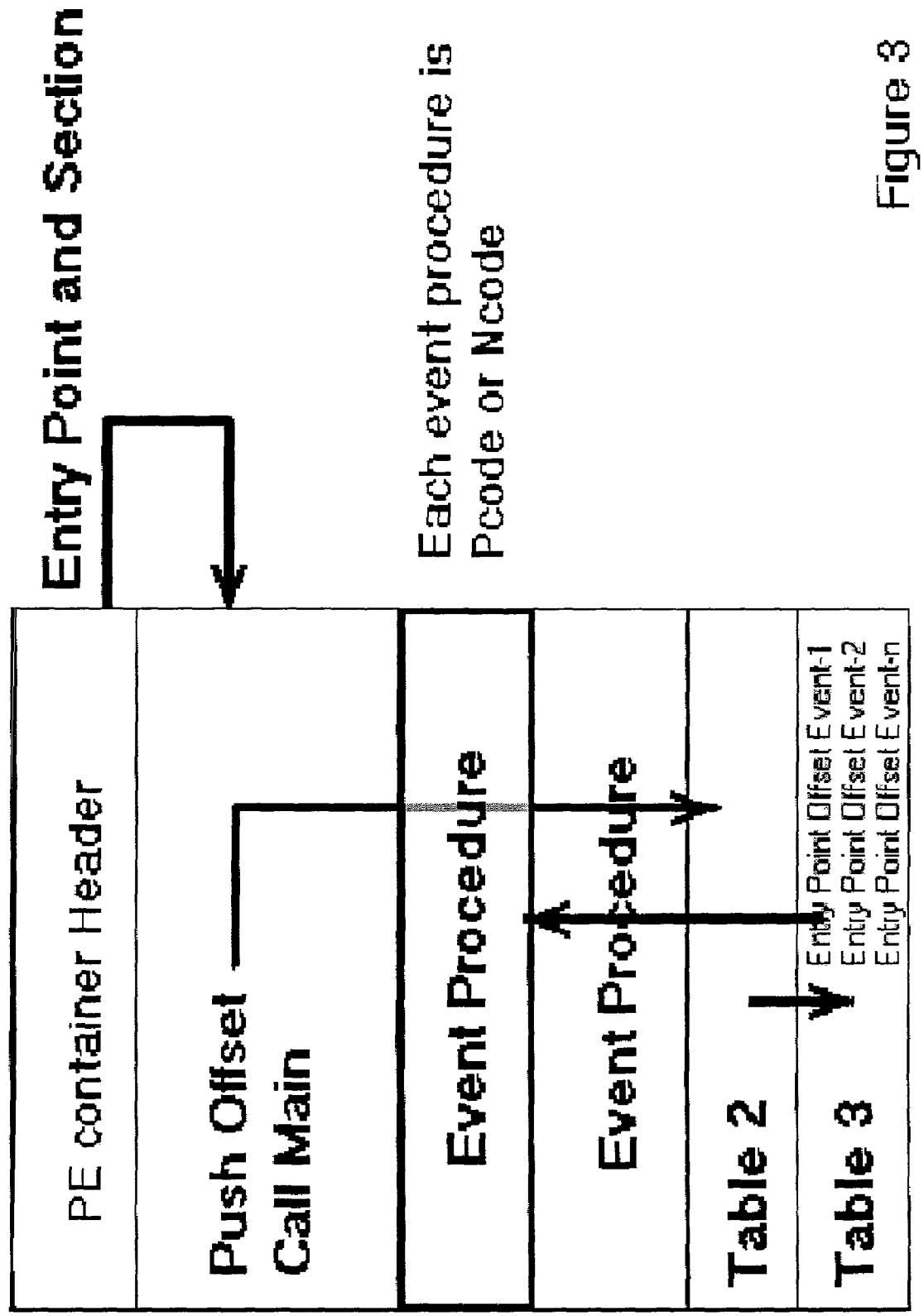
FIG. 3 schematically illustrates aspects of the P-code contained within a typical application program.

FIG. 3 provides a more detailed illustration of the P-code file structure within a PE or COFF file 'container' of the program structure within the virtual memory 18 of FIG. 2. FIG. 3 also illustrates an exemplary flow within a P-code program. The PE header provides the entry point to the program and a push to the table offset defined in the P-code header. There is then a call to ThunMain of the AVPE, which starts navigating the tables to find the event procedures, which precede the tables in the memory.

Figure 4:
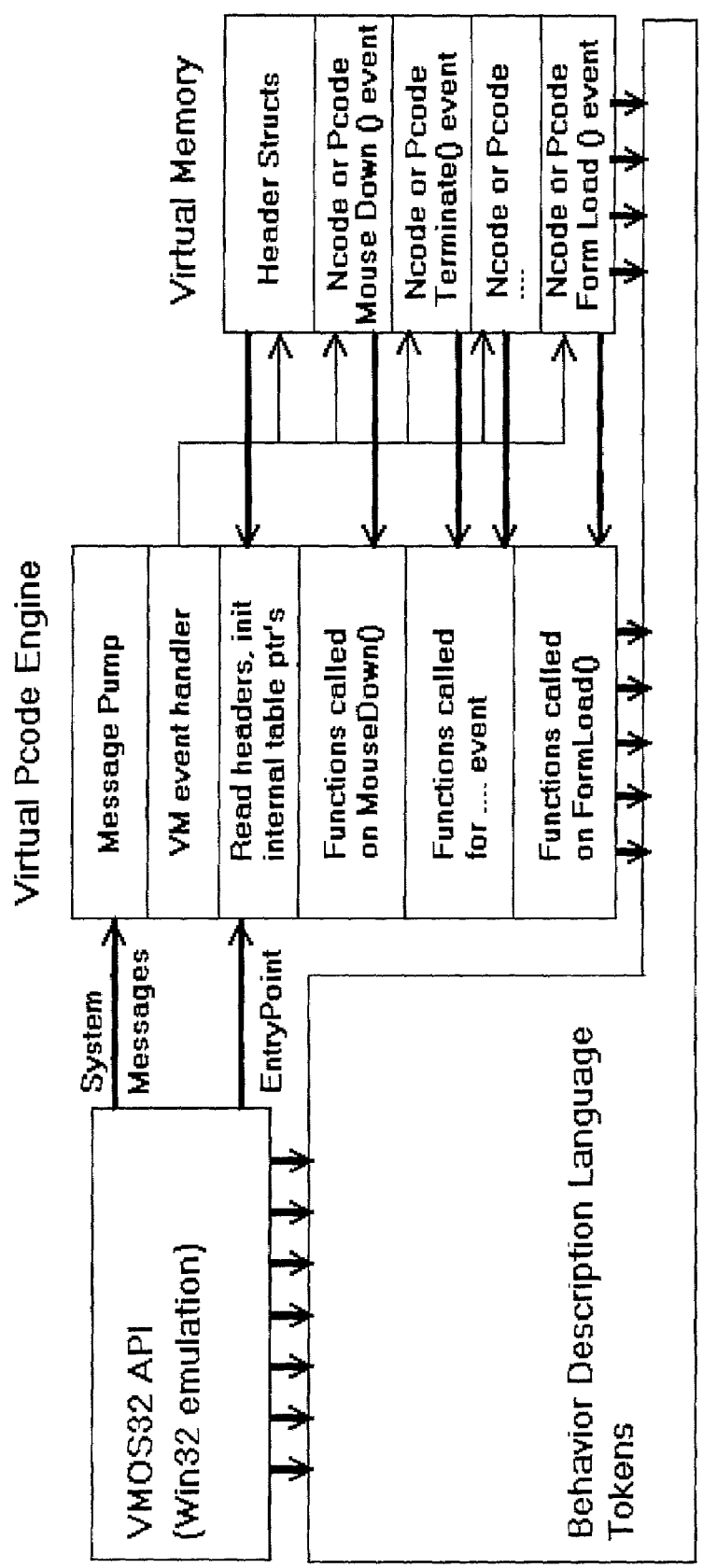
FIG. 4 illustrates an interface of an analytical virtual P-code engine (AVPE) to various program file formats including Visual Basic (VB) P-code and VB-native (N-code).

FIG. 4 illustrates how visual basic (VB) P-code and VB-native (N-code) file formats interface with the preferred virtual PC in accordance with certain embodiments of the present invention. After the file format has been evaluated and the tables have been interpreted the entry point-file offsets for each event procedure are calculated. The file is opened and the AVM reads the relevant code into virtual memory as a data stream. The length of the code of each event procedure is calculated from fields in the tables that were earlier read from the file. This information is passed to the virtual program loader. The virtual program loader uses information in the file header to load the extracted code at the correct simulated offset in a virtual memory array. The message pump that is present in most Win32 program is, in the case of P-code or N-code programs, located in the AVPE. The message pump is sequentially triggered with system messages, decoded in the VM event handler and derived from the tables imported earlier from the file, in a manner that assures that each event procedure is called at least once. As each event procedure in a P-code program is triggered, the AVPE retrieves the P-code from the entry point of each event procedure, decodes that P-code and virtually performs the associated processing. N-code programs are executed by the virtual central processing unit and call application program interface (API) library functions within the AVPE. P-code AVPE functions are closely associated with the same functions compiled to N-code.

Throughout the operation of the FIG. 4 P-code engine, data in the form of behavior description language tokens are exchanged with the Tbehavior class defined within the Tstruct class for recording the behavior of the P-code program as it is executed. Thus, all of the illustrated actions of the P-code engine are recorded within the Tstruct and that Tstruct class is stored so that it survives after the instance of the AVPE and the corresponding P-code or other program is terminated.

A memory mapping utility maps the virtual memory map to the offset for the file type that is virtualized. The loader utility dynamically assigns physical memory to the virtual computer memory array each time a program is virtualized, and proceeds to build a new AVPE. Each AVPE contains a filled environment string area. Each virtualized program runs in a fresh memory area, created when that program is loaded into the virtual PC. Previous instances, where infected programs may have been virtualized, therefore cannot affect the performance of subsequent programs. An exception to this rule is where the program is spawned from a previous instance of a program, for instance where a program creates or drops another program that was contained within the body of the first program. In the cased of spawned programs, the memory resources are shared, as are the virtual file system and the operating system data areas and registry. At the end of the virtualization process, the AVPE is shut down and its memory resources are released (deallocated) and the AVPE completes assembly of the behavior pattern for the target program.

Figure 5:
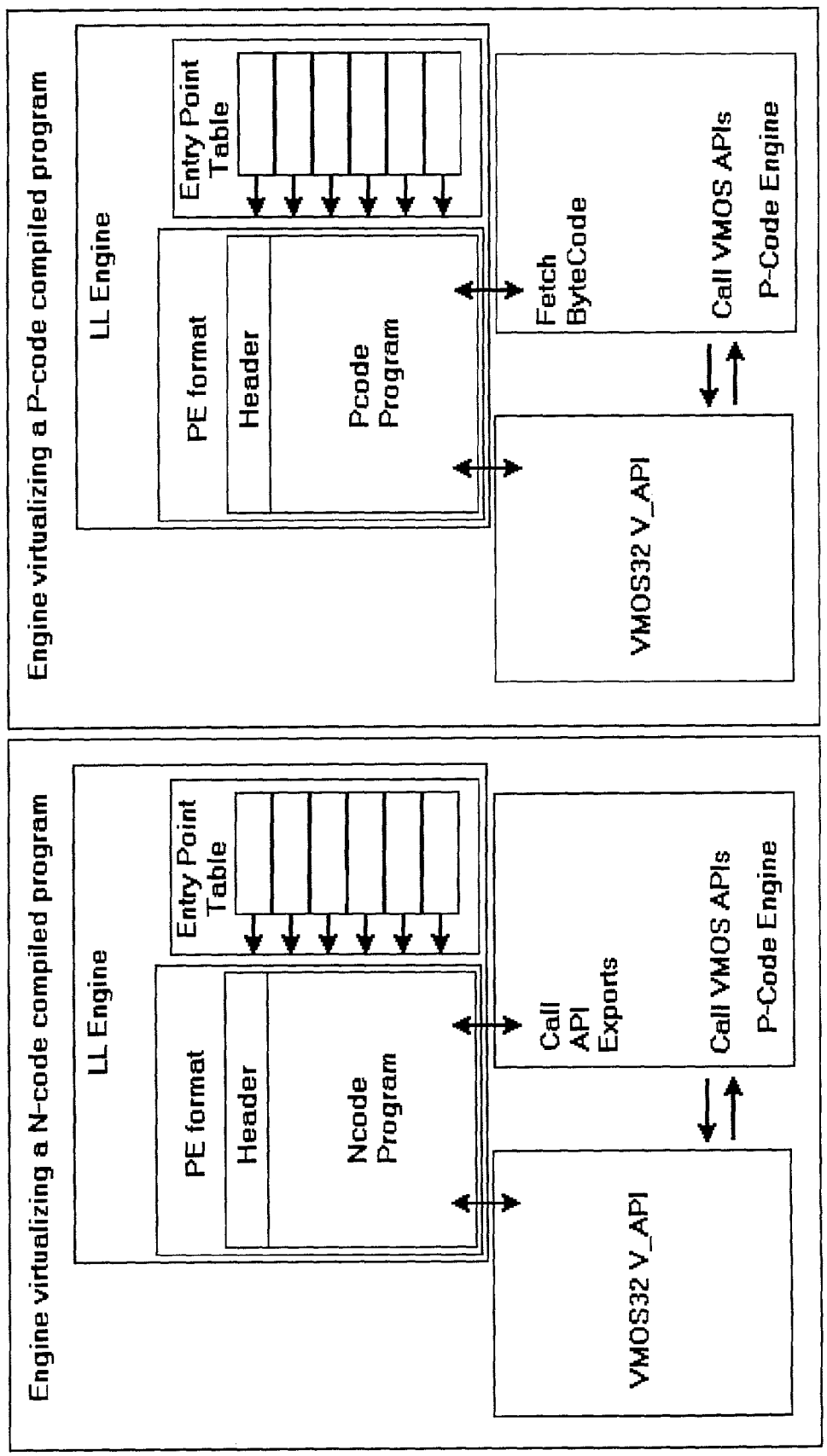
FIG. 5 schematically illustrates the virtual PC memory map after loading a compiled P-code program and after loading an N-code executable program.

FIG. 5 illustrates how the virtual memory is configured for both P-code and N-code programs. The memory map and mapper utility are adjusted depending on the file type. FIG. 5 schematically illustrates the virtual PC memory map after loading a compiled P-code program and after loading a N-code executable program. To virtualize the code in the desired manner, the structure of the virtual PC and its memory map contains the same information as it would if the code was executed on the physical P-code engine that exists within the PC that runs a P-code Virtual Machine.

The program loader simulates the loader functions of the operating system and creates system areas that represent similar system areas in the physical computer. This is particularly advantageous functionality because the code under evaluation most preferably runs in the same manner as if executed on a physical computer system. The program headers follow the PE headers, which contain the entry point of the program. At that entry point a value is pushed onto the stack, followed by a call to the P-code engine initialization routine usually called 'main' or 'ThunRTmain'. The value pushed onto the stack represents the point at which the AVPE starts interpreting the header tables. Depending on the content of these tables the event procedures that follow the tables are either compiled to P-code or N-code. In the case of N-code, the virtualized program is executed by fetching instructions from the virtual memory array into a pre-fetch instruction queue. The instructions in the queue are decoded and their length is determined by their operational parameters.

The instruction pointer is incremented accordingly so that the instruction loader is ready to fetch the next instruction. The virtual low level (LL) engine determines from the rim field of the instruction parameters where to fetch the data on which the instruction operates. The data fetch mechanism fetches this data and presents the data to the logic unit, which then performs the operation indicated by the code. The destination of the processed data is determined from the parameters of the instruction code. The data write mechanism is used to write the processed data to emulated memory or the emulated processor register set. This process accurately reflects what takes place in a physical CPU (central processing unit). Where the virtual CPU encounters an API call to the P-code virtual machine, a call to the AVPE API is substituted.

Figure 6A:
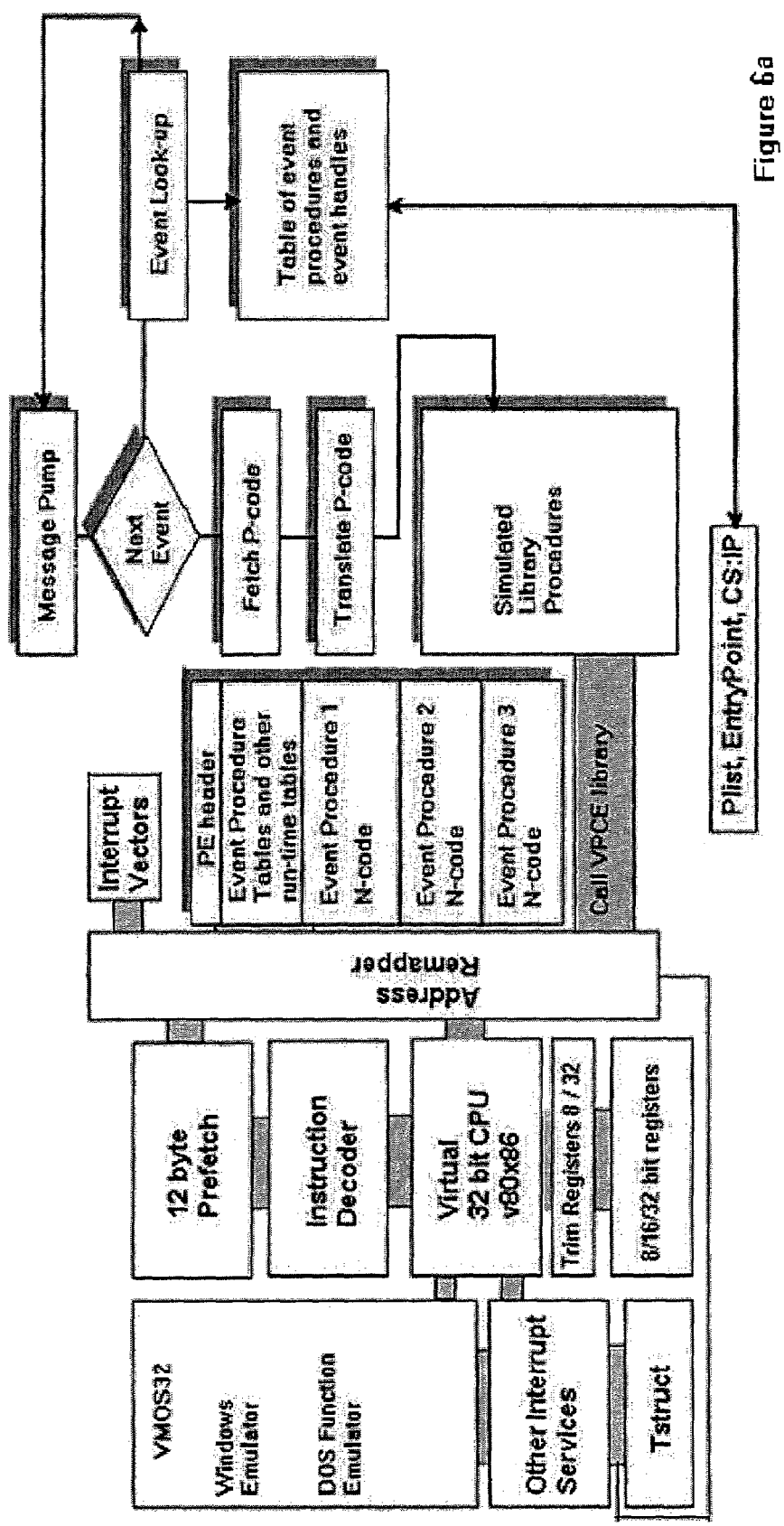
FIGS. 6a and 6b show components of a preferred implementation of an analytical virtual P-code engine (AVPE).
Figure 6B:
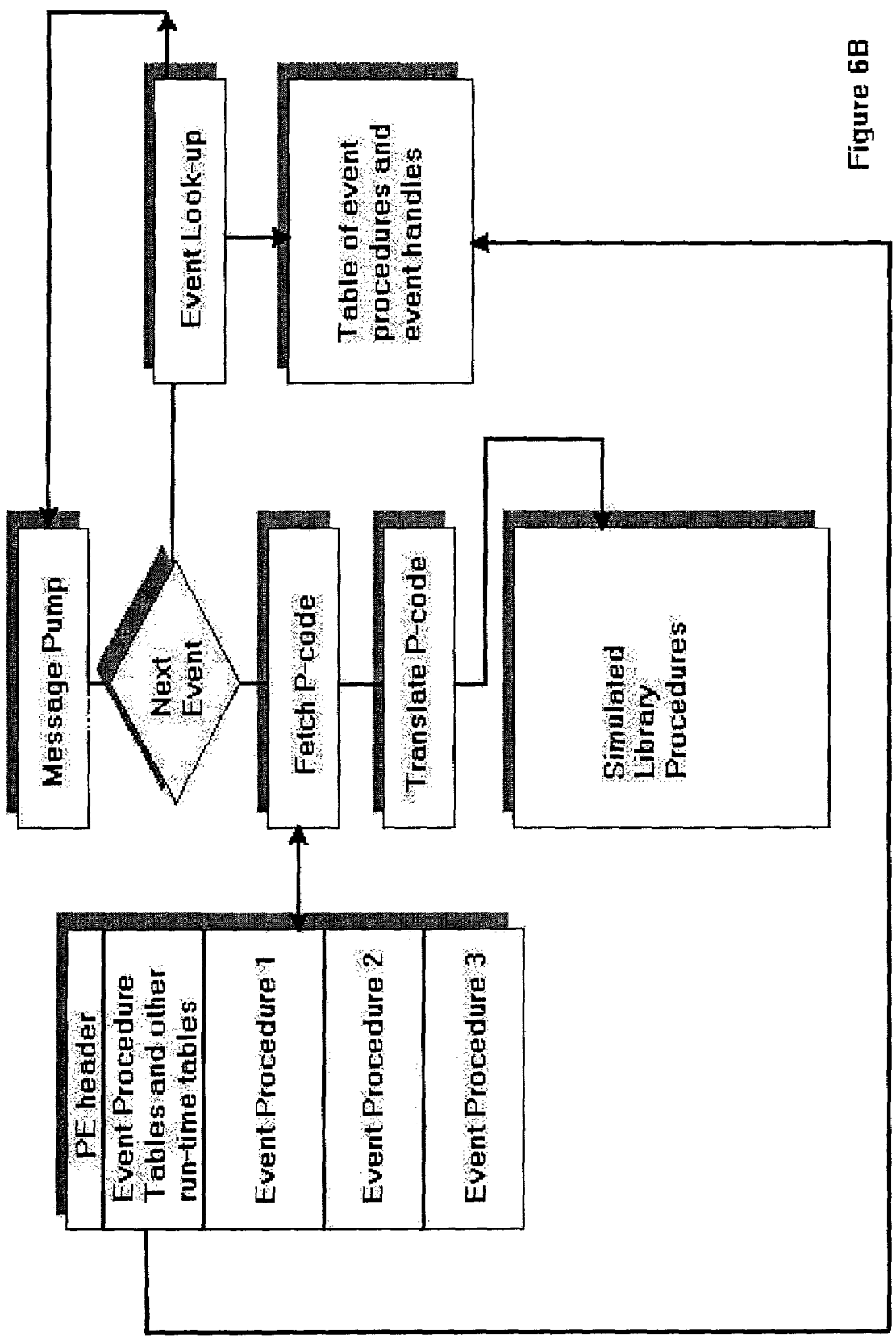

FIGS. 6a and 6b llustrate components of a preferred implementation of an analytical virtual P-code engine (AVPE) and the interaction of the AVPE within the AVM and components of the AVM. The AVPE contains the same components as are used in a physical computer, except that all components are simulated in software running an (AVM) analytical virtual machine on a physical computer. The event procedure table is extracted from the P-code or N-code compiled program tables. The entry point of these tables is pushed onto a stack at the entry point of the program, which is pointed at by the CS:IP value located in the PE header of the program file. The table is populated and the message pump is started, sequentially triggering each event procedure. In the case that the program is compiled to P-code, the P-code engine executes each event procedure by fetching each sub sequential P-code from the event procedure at the incremented offset defined in the event procedure table. The P-code is translated and processed by calling the appropriate library routines within the P-code engine. In the case of a program compiled to N-code, the library routines are called directly by the simulated central processing unit located in an analytical virtual machine. Analytical virtual machines (AVM) are described in U.S. patent application Ser. No. 09/885,427, filed on Jun. 19, 2001 and entitled "Analytical Virtual Machine," which application is hereby incorporated by reference in its entirety.

All areas of this process are simulated, as generally illustrated in FIG. 6a or 6b. The memory exists as an array of elements into which all memory accesses are mapped by a memory mapping mechanism. The size of the memory array may be adjusted to accommodate the size of the expected target programs, depending on the requirements of the system. The library routines contained within the AVPE are available as API's (application program interfaces) in the same way as the operating system API's function in the simulated operating system VMOS. The VMOS operating system is implemented as a virtual API (VAPI) that simulates the results returned by operating system API's.

During the virtualization process, flags are set in the behavior pattern (Tstruct) field as the functions represented by program instructions and/or API calls are virtualized. The sequence in which these functions are called is recorded in the sequencer. The behavior pattern therefore matches closely the behavior of the program under evaluation to the behavior of that program in a physical PC environment.

In case of programs compiled to P-code, the AVPE is initialized from within the virtual machine to fetch P-codes and interpret the P-codes. The AVPE then calls the appropriate library routines as API's to execute the function. The processing of subsequent instructions is very similar to the processing of N-code as described above, except that the P-code engine performs the fetching of P-codes from the virtual machine virtual memory array and performs the interpretation of those P-codes.

Encrypted viruses are no problem, because the execution of the code within the virtual machine effectively decrypts any encrypted, packed or polymorphic virus, as it would in a physical PC environment. These decryption and unpacking actions preferably take place before the P-code engine is initiated, since the virtual machine only finds out the nature of the embedded executable after unpacking or decryption. Because all parts of the virtual computer are virtualized in preferred embodiments, and at no time is the virtualized program allowed to interact with the physical computer, the viral code should not escape from the AVPE and infect the physical computer.

The present invention has been described here with respect to certain preferred embodiments thereof. Those of ordinary skill will appreciate that various modifications and alternate embodiments of the invention might be practiced without varying from the basic teachings of the present invention. As such, the present invention is not to be limited to the particular embodiments described here. Rather, the scope of the present invention is to be determined from the claims.

I claim:

1. A method for identifying presence of malicious code in program code within a computer system, the method comprising:

initializing an analytical virtual P-code engine (AVPE) within a virtual personal computer (PC) comprising software simulating functionality of a central processing unit (CPU), an operating system, input/output ports, and a memory, the AVPE comprising software simulating functionality of a P-code interpreter and library routines exposed as API's (Application Program Interfaces) for virtual execution of N-code compiled programs;

virtually executing a target program within the AVPE so that the target program interacts with the computer system only through the virtual PC;

generating a behavior pattern for the target program which includes flags for tracking functions performed by the target program and flags for tracking functions not performed by the target program during virtual execution, the flags forming a behavior pattern field that tracks a sequence in which the functions are called by the target program, the behavior pattern representing information about all functions simulated by the target program during virtual execution;

analyzing behavior of the target program upon completion of virtual execution to identify an occurrence of malicious code behavior based upon an evaluation of the flags in the behavior pattern field; and terminating the virtual PC after the analyzing process, thereby removing from the computer system a copy of the target program that was contained within the virtual PC.

2. The method of claim 1, wherein terminating the virtual PC includes deallocating of all resources of a virtual memory implemented by the software simulating functionality of the memory.

3. The method of claim 1, further comprising deallocating all resources of a virtual memory containing data or program statements created by virtual execution of the target program, the virtual memory implemented by the software simulating functionality of the memory.

4. The method of claim 1, wherein the library routines for N-code compiled programs are exposed to the AVPE through one of the API's.

5. The method of claim 1, wherein the P-code comprises virtual machine code and a run-time engine simulates the operations performed by each P-code.

6. The method of claim 1, wherein the virtual PC simulates functionality of data areas for the, operating system, and API's for the operating system.

7. The method of claim 6, wherein the virtual PC further comprises software for simulating the functionality of BIOS firmware and language emulators.

8. The method of claim 6, wherein virtual execution of the target program causes the target program to interact with the operating system application program interface simulated by the AVPE.

9. The method of claim 1, wherein the target program is newly introduced to the computer system and not executed prior to virtually executing the target program.

10. The method of claim 1, wherein after a first instance of a first program is analyzed by the AVPE and a first behavior pattern is generated and stored in a database within the computer system, the method further comprising:

determining that the first program is modified;

analyzing the modified first program by executing the modified first program in the AVPE to provide a second behavior pattern; and comparing the first behavior pattern to the second behavior pattern to determine whether the second behavior pattern is altered from the first behavior pattern in a manner indicative of presence of the malicious code in the modified first program.

11. The method of claim 10, wherein a new behavior pattern is generated each time the first program is modified.

12. The method of claim 10, wherein introduction of malicious code during modification of the first program is detected by comparing the first behavior pattern to the second behavior pattern and identifying altered bits indicating an addition of an infection procedure to the modified first program.

13. The method of claim 10, wherein the first behavior pattern is identified as a match to the second behavior pattern when the modified first program is a new version of the first program.

14. The method of claim 1, wherein the behavior pattern identifies functions executed in the virtual execution of the target program, the method further comprising tracking an order in which the functions are virtually executed by the target program within the AVPE to provide a complete record of all functions simulated by the target program, as if the target program was executed on the computer system.

15. The method of claim 1, wherein a virtual central processing unit, implemented by software simulating the functionality of the CPUs is distinct from the AVPE.

16. A method for identifying presence of malicious code in program code within a computer system, the method comprising:
   initializing a virtual PC within the computer system, the virtual PC, implemented by software, comprising a virtual central processing unit simulating functionality of a central processing unit, virtual memory simulating the functionality of memory and a virtual operating system simulating functionality of an operating system including application program interface (API) calls;
   virtually executing a target program with the virtual PC so that the target program interacts only with an instance of the virtual operating system rather than with the operating system of the computer system, whereby the malicious code is fully executed during virtual execution of the target program if the target program is infected by the malicious code;
   generating a behavior pattern for the target program which includes flags for tracking functions performed by the target program and flags for tracking functions not performed by the target program during virtual execution, the flags forming a behavior pattern field that tracks a sequence in which the functions are called by the target program, the behavior pattern representing information about all functions simulated by the target program during virtual execution; and
   terminating the virtual engine upon completion of the virtual execution of the target program, leaving behind a record of the behavior pattern that is representative of operations of the target program with the computer system, including operations of the malicious code if the target program comprises the malicious code.

17. The method of claim 16, wherein the record is matched to a plurality of predefined behavior patterns, each representative of a single malicious code function.

18. The method of claim 16, wherein after a first instance of a first program is virtually executed by the virtual PC and a first behavior pattern is generated and stored in a database coupled to the computer system, the method further comprising:
   determining that the first program is modified;
   executing the modified first program with the virtual PC to provide a second behavior pattern; and
   comparing the first behavior pattern to the second behavior pattern to determine whether the second behavior pattern is altered from the firm behavior pattern in a manner indicative of presence of the malicious code in the modified first program.

19. The method of claim 18, wherein a new behavior pattern is generated each time the first program is modified.

20. The method of claim 18, wherein introduction of the malicious code by modification of the first program is detected by comparing the first behavior pattern to the second behavior pattern and identifying altered bits indicating an addition of an infection procedure to the modified first program.

21. The method of claim 18, wherein the first behavior pattern is identified as a match to the second behavior pattern when the modified first program is a new version of the first program.

22. The method of claim 18, wherein the behavior pattern identifies all functions executed during the virtual execution of the target program and records an order of simulation of the functions.

23. A method for identifying presence of malicious code in program code within a computer system, the method comprising:
   initializing an analytical virtual P-code engine (AVPE) of a virtual PC operating within the computer system, the AVPE simulating functionality of a P-code interpreter, the virtual PC comprising a virtual central processing unit, a virtual operating system and virtual memory;
   virtually executing a target program within the AVPE so that the target program interacts with the computer system only through the virtual PC;
   generating a behavior pattern for the target program which includes flags for tracking functions performed by the target program and flags for tracking functions not performed by the target program during virtual execution, the flags forming a behavior pattern field that tracks a sequence in which the functions are called by the target program, the behavior pattern representing information about all functions simulated by the target program during virtual execution;
   analyzing the behavior pattern of the target program generated by completion of virtual execution of the target program to identify an occurrence of malicious code behavior based upon an evaluation of the flags in the behavior pattern field; and
   terminating the virtual PC, thereby removing from the host computer system a copy of the target program that was contained within the AVPE.

24. The method of claim 23, wherein terminating the virtual PC includes deallocating of all virtual memory resources.

25. The method of claim 23, further comprising deallocating all virtual memory resources containing data or program statements created by the target program.

26. The method of claim 23, further comprising the step of exposing for the AVPE to low level engines and language interpreters of the virtual PC through an application program interface for the virtual execution of N-code compiled programs.

27. The method of claim 25, wherein P-code comprises virtual machine code and a run-time engine simulates the operations performed by each P-code.

* * * * *